United States Patent
Desmarais et al.

(10) Patent No.: US 11,326,943 B2
(45) Date of Patent: May 10, 2022

(54) IRRADIATION DECECTION IN DATA COLLECTION DEVICES

(71) Applicant: Carrier Corporation, Farmington, CT (US)

(72) Inventors: Richard Desmarais, Londonderry, NH (US); Eric Day, Beverly, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 872 days.

(21) Appl. No.: 15/998,827

(22) PCT Filed: Feb. 15, 2017

(86) PCT No.: PCT/US2017/017916
§ 371 (c)(1),
(2) Date: Aug. 15, 2018

(87) PCT Pub. No.: WO2017/142911
PCT Pub. Date: Aug. 24, 2017

(65) Prior Publication Data
US 2021/0207995 A1    Jul. 8, 2021

Related U.S. Application Data

(60) Provisional application No. 62/295,680, filed on Feb. 16, 2016.

(51) Int. Cl.
*G01J 1/50* (2006.01)
*G01K 11/12* (2021.01)

(52) U.S. Cl.
CPC .................... *G01J 1/50* (2013.01)

(58) Field of Classification Search
CPC .................. G01J 1/50; G01K 11/12
See application file for complete search history.

(56) References Cited

U.S. PATENT DOCUMENTS 4,929,818 A     5/1990   Bradbury et al.
5,246,905 A *   9/1993   Sekine ................ B41M 5/3333
                                              503/208
(Continued)

FOREIGN PATENT DOCUMENTS

AU    2008100976 A4    12/2008
CN    102153959 A       8/2011
(Continued)

OTHER PUBLICATIONS

International Search Report for International Application No. PCT/US2017/017916; International Filing Date Feb. 15, 2017; dated May 4, 2017; 6 Pages.
(Continued)

*Primary Examiner* — David P Porta
*Assistant Examiner* — Fani Boosalis
(74) *Attorney, Agent, or Firm* — Cantor Colburn LLP

(57) ABSTRACT

A data collection device includes a housing and a data collection unit located in the housing. A power unit is located in the housing and is operably connected to the data unit to provide power for operation of the data unit. An irradiation sensor is located at the data collection device to detect exposure of the data collection device to irradiation. An irradiation sensor includes a thermal energy absorbing material and a thermal energy sensitive material in thermal communication with the thermal energy absorbing material. The thermal energy sensitive material is characterized by a change in color when exposed to a selected degree of thermal energy due to irradiation.

14 Claims, 3 Drawing Sheets

(56) References Cited

U.S. PATENT DOCUMENTS

| | | |
|---|---|---|
| 6,114,941 A | 9/2000 | Scott |
| 6,480,091 B1 | 11/2002 | Scott et al. |
| 6,546,211 B1 | 4/2003 | Shishikura |
| 7,600,912 B2 * | 10/2009 | Leute .................. G01K 3/005 374/157 |
| 8,278,631 B2 | 10/2012 | Patel |
| 8,343,437 B2 | 1/2013 | Patel |
| 9,239,254 B1 | 1/2016 | Parvarandeh |
| 2007/0229088 A1 | 10/2007 | Suzuki |
| 2009/0153837 A1 * | 6/2009 | Wang .................. G01J 1/4257 356/43 |
| 2010/0020846 A1 * | 1/2010 | Kagan .................. B82Y 15/00 374/141 |
| 2010/0329950 A1 * | 12/2010 | Faran .................... G01J 1/50 422/400 |

FOREIGN PATENT DOCUMENTS

| | | |
|---|---|---|
| CN | 203133918 U | 8/2013 |
| CN | 203758641 U | 8/2014 |
| DE | 3639772 A1 | 6/1987 |
| EP | 2172155 A1 | 4/2010 |
| EP | 2937850 A1 | 10/2015 |
| FR | 2251248 A5 | 6/1975 |
| JP | 04292871 A | 10/1992 |
| WO | 2004090368 A1 | 10/2004 |
| WO | 2014160939 A2 | 10/2014 |
| WO | 2015069050 A1 | 5/2015 |

OTHER PUBLICATIONS

Written Opinion for International Application No. PCT/US2017/017916; International Filing Date Feb. 15, 2017; dated May 4, 2017; 7 Pages.

* cited by examiner

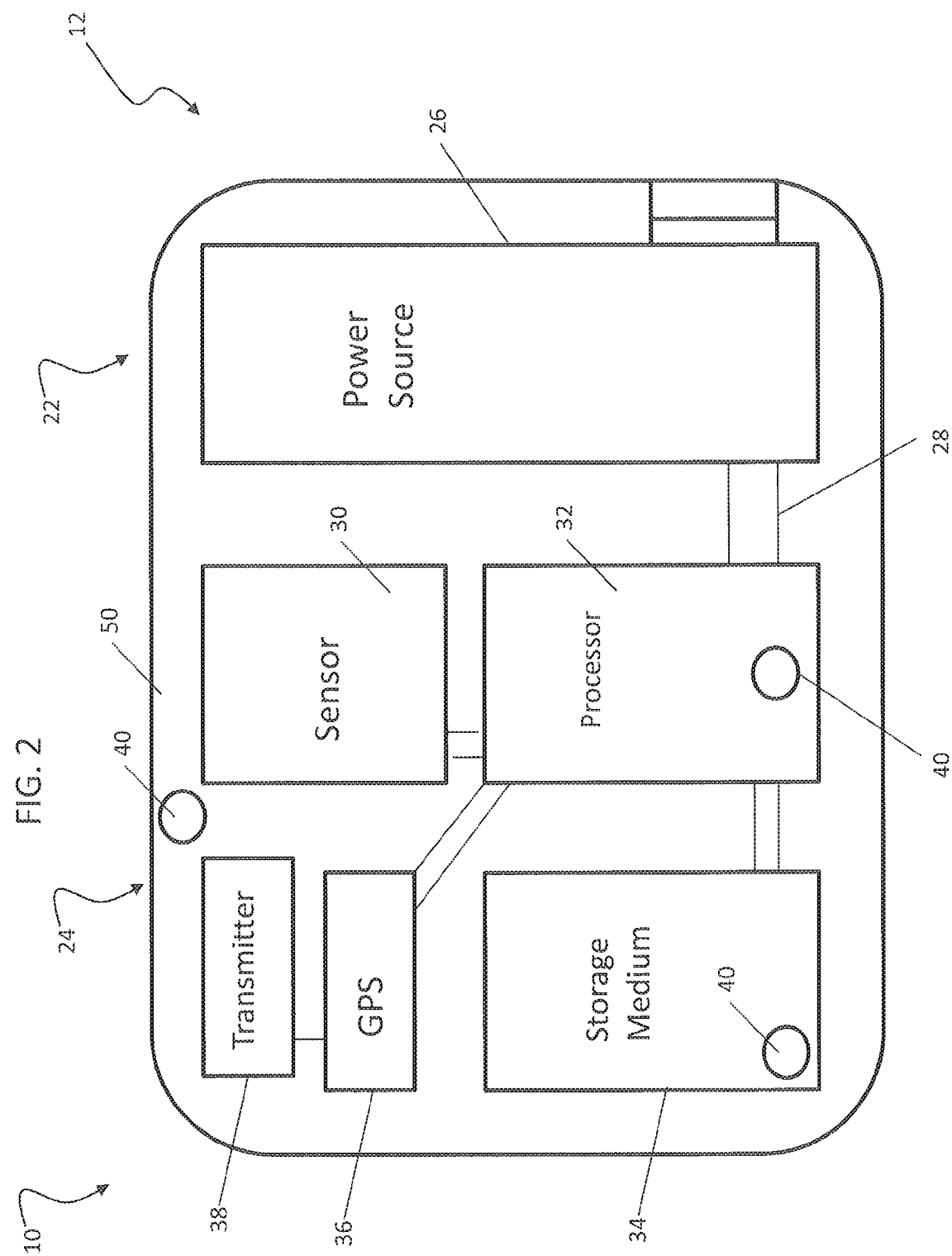

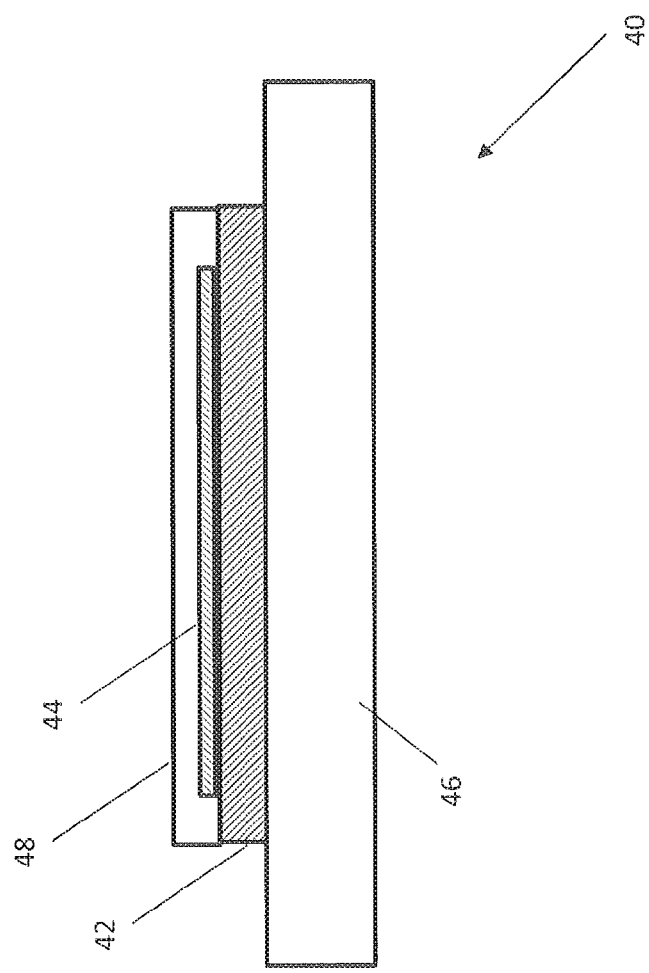

IRRADIATION DECECTION IN DATA COLLECTION DEVICES

CROSS REFERENCE TO RELATED APPLICATIONS

This application is a National Stage application of PCT/US2017/017916, filed Feb. 15, 2017, which claims the benefit of U.S. Provisional Application No. 62/295,680, filed Feb. 16, 2016, both of which are incorporated by reference in their entirety herein.

BACKGROUND

Exemplary embodiments of the invention relate generally to monitoring cargo while in transit, and more particularly to a portable, reusable electronic device for monitoring a location and temperature of cargo in transit.

Asset management is an important part of commerce. Tracking assets is important to organizations of all kinds, whether it be a company keeping track of inventory to be sold in its stores, or a package delivery provider keeping track of packages being transported through its delivery network. For certain goods and containers, it is vital to control the conditions inside the container, so that the goods reach their final destination in a state fit to be used. In many cases, if the conditions under which the goods are shipped are not to the required standards, their use may be dangerous and even cause death, as in the case of medicines. Exemplary parameters that may be monitored include the internal temperature of the container to determine if the temperature exceeds the permitted range and the percentage of moisture, oxygen or carbon dioxide in the container. Typical electronic tracking devices may include a plastic housing including sensors, circuitry for processing sensed information, an electronic storage medium for storage of the sensed and/or processed data, and a transmitter to communicate with a remote user.

With certain cargo, such as produce, it is becoming commonplace to irradiate the cargo to protect the cargo and consumers from contamination by microbes and/or bacteria or other undesirable organisms. Irradation of the cargo, however, is often performed without the knowledge of the delivery provider. Further, this irradiation can damage electronic components of the tracking devices, rendering the tracking devices unreliable or even inoperable.

BRIEF SUMMARY

In one embodiment, a data collection device includes a housing and a data collection unit located in the housing. A power unit is located in the housing and is operably connected to the data unit to provide power for operation of the data unit. An irradiation sensor is located at the data collection device to detect exposure of the data collection device to irradiation.

Additionally or alternatively, in this or other embodiments the irradiation sensor includes a thermal energy absorbing material and a thermal energy sensitive material in thermal communication with the thermal energy absorbing material. The thermal energy sensitive material is characterized by a change in color when exposed to a selected degree of thermal energy due to irradiation.

Additionally or alternatively, in this or other embodiments the irradiation sensor is located at an interior of the housing.

Additionally or alternatively, in this or other embodiments the thermal energy absorbing material is an aluminum or aluminum-containing material.

Additionally or alternatively, in this or other embodiments the irradiation sensor includes a first layer including the thermal energy absorbing material and a second layer applied over the first layer, the second layer including the thermal energy sensitive material.

Additionally or alternatively, in this or other embodiments the first layer is applied as one of a sticker or paint.

Additionally or alternatively, in this or other embodiments the second layer is applied as one of a sticker or paint.

Additionally or alternatively, in this or other embodiments the irradiation sensor is a homogenous mixture of the thermal energy absorbing material and the thermal energy sensitive material.

Additionally or alternatively, in this or other embodiments the data collection unit includes one or more analog or digital sensors and a processor operably connected to the one or more analog or digital sensors to process data acquired by the one or more analog or digital sensors.

Additionally or alternatively, in this or other embodiments the irradiation sensor is applied to a printed circuit board material of the processor.

Additionally or alternatively, in this or other embodiments the one or more analog or digital sensors includes one or more of a shock sensor, a temperature sensor or a humidity sensor.

Additionally or alternatively, in this or other embodiments the color change of the thermal energy sensitive material is permanent.

In another embodiment, an irradiation sensor includes a thermal energy absorbing material and a thermal energy sensitive material in thermal communication with the thermal energy absorbing material. The thermal energy sensitive material characterized by a change in color when exposed to a selected degree of thermal energy due to irradiation.

Additionally or alternatively, in this or other embodiments the thermal energy absorbing material is an aluminum or aluminum-containing material.

Additionally or alternatively, in this or other embodiments the irradiation sensor includes a first layer including the thermal energy absorbing material and a second layer applied over the first layer, the second layer including the thermal energy sensitive material.

Additionally or alternatively, in this or other embodiments the first layer is applied as one of a sticker or paint.

Additionally or alternatively, in this or other embodiments the second layer is applied as one of a sticker or paint.

Additionally or alternatively, in this or other embodiments the irradiation sensor is a homogenous mixture of the thermal energy absorbing material and the thermal energy sensitive material.

Additionally or alternatively, in this or other embodiments the color change of the thermal energy sensitive material is permanent.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2 is a plan view of an interior of an embodiment of a data collection device; and FIG. 3 is a cross-sectional view of an embodiment of an irradiation sensor for a data collection device.

Figure 1:
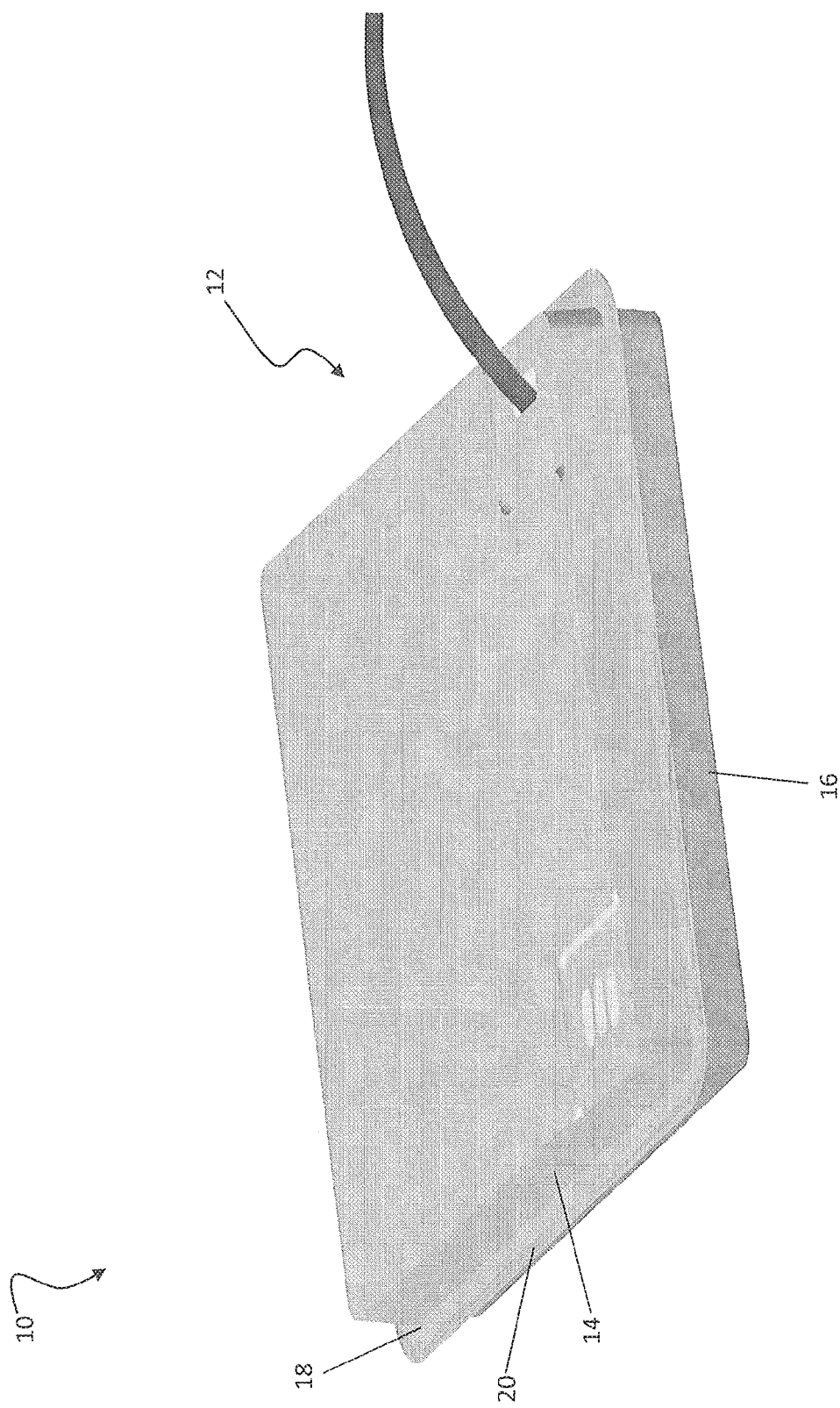
FIG. 1 is a perspective view of an exterior of an embodiment of a data collection device.

The detailed description explains embodiments, together with advantages and features, by way of example with reference to the drawings.

DETAILED DESCRIPTION

Referring now to FIG. 1, a portable, reusable data collection device 10 including a protective housing 12 is illustrated. The housing 12 includes a complementary top portion 14 and bottom portion 16. In one embodiment, the housing 12 is formed from a plastic material, such as through a thermoforming process. The top portion 14 of the housing 12 and the bottom portion 16 of the housing 12 may be formed separately, or may be integrally formed such that the housing 12 has a clamshell configuration. In one embodiment, a top flange 18 and a bottom flange 20 extend about a periphery of the top portion 14 and the bottom portion 16 of the housing 12, respectively. The top flange 18 and the bottom flange 20 are configured to contact one another when the data collection device 10 is assembled. In one embodiment, the top and bottom flanges 18, 20 may be sealed together, such as through an RF heat sealing process or with an adhesive for example.

The housing 12 is configured to contain a plurality of components of the data collection device 10. For example, as shown in FIG. 2, the housing 12 may contain a power unit 22 and a data unit 24. The power unit 22 generally includes at least one power source 26, such as a battery, configured to supply power to the data unit 24 and any device electrically connected thereto, such as via a first set of leads 28 for example. The at least one power source 26 may be any size and/or configuration. In one embodiment, the at least one power source 26 within the power unit 22 is rechargeable. If the at least one power source 26 is rechargeable, the power unit 22 may be configured to connect an external charging device (not shown) directly to the power source 26. Alternatively, the at least one rechargeable power source 26 may be recharged when the data collection device 10 is connected to an external power supply, such as an AC or DC voltage source for example.

The data unit 24 is operably coupled to the power unit 22 and includes one or more digital or analog sensors 30 and a processor 32. The processor 32 of the data unit 24 may be configured to monitor the data measured by the sensor(s) 30 and store the processed data at an electronic storage medium 34. In one embodiment, the data unit 24 includes an accelerometer configured to function as a shock sensor 30 by monitoring the motion of the data collection device 10. In the non-limiting embodiment illustrated in FIG. 1, the data unit 24 includes a temperature sensor 30 configured to measure the ambient temperature surrounding the data collection device 10. In yet another embodiment, the one or more sensors 30 may include a humidity sensor 30. Some embodiments may further include a global positioning receiver 36 that, together with the processor 32, determines a position using global position data and/or through triangulation of data provided from network services, such as a cellular network for example. Some embodiments may further include a transmitter 38 to transmit processed data obtained from the one or more sensors 30 and/or position data obtained by the global positioning receiver 36 either wirelessly via a cellular network or Wi-Fi connection, or alternatively via a wired connection. It is to be appreciated that the arrangement of components shown in FIGS. 1 and 2, is merely one example and other arrangements of the data collection device 10 components in the housing 12 are contemplated within the scope of the present disclosure.

An irradiation sensor 40 is located in or on the data collection device 10 to detect irradiation of the data collection device 10. In some embodiments, the irradiation sensor 40 is located at an exterior of the housing 12, while in other embodiments the irradiation sensor 40 is located inside of the housing 12 to protect the irradiation sensor 40 from ambient temperature around the data collection device 10. The irradiation sensor 40 may be placed, for example, the storage medium 34 or at the processor 32 or at one or more of other components in the housing 12. Further, in some embodiments, the irradiation sensor 40 may be placed at an interior wall 50 of the housing 12. Preferably, the irradiation sensor 40 is placed away from heat sources of the data collection device 10, such as the power source 26 and any leads or traces carrying electrical power. It is to be appreciated that, while the irradiation sensor 40 may be located at an electronic component of the data collection device 10, the irradiation sensor 40 is not itself an electronic device, as will be further explained below.

Referring now to FIG. 3, the irradiation sensor 40 includes a heat absorbing material 42 and a heat sensitive material 44, which changes color in response to heat exposure, also known herein as color-changing material. In some embodiments, as shown, the heat absorbing material 42 is a bottom layer, and may be in sticker form and adhered to, for example, a printed circuit board material 46 of the processor 32. In other embodiments, the heat absorbing material 42 may be applied to the printed circuit board material 46 in paint form. The heat absorbing material 42 may be, for example, an aluminum material or aluminum-containing material, which readily absorbs thermal energy or heat. An example of such thermal energy would be thermal energy from irradiation, either commercially or from a microwave oven or from another source.

The heat sensitive material 44 is formed from one of a variety of thermally-sensitive materials. In some embodiments, the heat sensitive material 44 may be adhered to the heat absorbing material 42 via adhesive, while in other embodiments, the heat sensitive material 44 may be applied to the heat absorbing material 42 in paint form. In some embodiments, the heat sensitive material 44 is a thermal paper that changes color when heated, typically from a first, light, color to a second, relatively dark, color. The heat sensitive material 44 is placed over the heat absorbing material 42 so that thermal energy absorbed by the heat absorbing material 42 is conducted to the heat sensitive material 44, causing a permanent color change of the heat sensitive material 44. The color change is indicative of exposure of the irradiation sensor 40 to an amount of thermal energy equivalent to that expected due to the data collection device 10 being irradiated. In some embodiments, a protective overlayer 48 may be placed or adhered over the irradiation sensor 40 to protect the irradiation sensor 40 from damage or removal, while still allowing function of the heat absorbing material 42 and the heat sensitive material 44. In some embodiments, the overlayer 48 is transparent so the color of the heat sensitive material 44 is observable through the overlayer 48.

In another exemplary embodiment, both the heat absorbing material 42 and the heat sensitive material 44 are both in paint form. The heat absorbing material 42 and the heat sensitive material 44 may be homogenously mixed together and painted onto, for example, a portion of the printed circuit board material 46. While the irradiation sensor 40 is described herein as being placed at the printed circuit board material 46 of the processor 32, it is to be appreciated that the irradiation sensor 40 may be placed at any suitable location of the data collection device 10. Further, in some embodiments, multiple irradiation sensors 40 may be utilized in various locations of the data collection device 10.

Use of the irradiation sensors 40 allows for cargo shippers, data collection device manufacturers and service personnel and other such parties to readily determine a potential cause of failure or malfunction of the data collection device by irradiation via an easily observable color change in the irradiation sensor 40. Further, the irradiation sensor 40 makes the cargo shipper aware of any irradiation of their goods throughout the shipping lane.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A data collection device comprising:
   a housing;
   a data collection unit disposed in the housing;
   a power unit disposed in the housing and operably connected to the data unit to provide power for operation of the data unit; and
   an irradiation sensor disposed at the housing to detect exposure of the data collection device to irradiation;
   wherein the irradiation sensor includes:
      a first layer including thermal energy absorbing material; and
      a second layer including a thermal energy sensitive material applied over the first layer, the thermal energy sensitive material characterized by a change in color when exposed to a selected degree of thermal energy due to irradiation;
   wherein the first layer is applied as one of a sticker or a paint.

2. The data collection device of claim 1, wherein the irradiation sensor is disposed at an interior of the housing.

3. The data collection device of claim 1, wherein the thermal energy absorbing material is an aluminum or aluminum-containing material.

4. The data collection device of claim 1, wherein the second layer is applied as one of a sticker or paint.

5. The data collection device of claim 1, wherein the irradiation sensor is a homogenous mixture of the thermal energy absorbing material and the thermal energy sensitive material.

6. The data collection device of claim 1, wherein the data collection unit includes:
   one or more analog or digital sensors; and
   a processor operably connected to the one or more analog or digital sensors to process data acquired by the one or more analog or digital sensors.

7. The data collection device of claim 6, wherein the irradiation sensor is applied to a printed circuit board material of the processor.

8. The data collection device of claim 6, wherein the one or more analog or digital sensors includes one or more of a shock sensor, a temperature sensor or a humidity sensor.

9. The data collection device of claim 1, wherein the color change of the thermal energy sensitive material is permanent.

10. An irradiation sensor comprising:
    a first layer including a thermal energy absorbing material; and
    a second layer including a thermal energy sensitive material in thermal communication with the thermal energy absorbing material, the thermal energy sensitive material characterized by a change in color when exposed to a selected degree of thermal energy due to irradiation;
    wherein the first layer is applied as one of a sticker or a paint.

11. The irradiation sensor of claim 10, wherein the thermal energy absorbing material is an aluminum or aluminum-containing material.

12. The irradiation sensor of claim 10, wherein the second layer is applied as one of a sticker or paint.

13. The irradiation sensor of claim 10, wherein the irradiation sensor is a homogenous mixture of the thermal energy absorbing material and the thermal energy sensitive material.

14. The irradiation sensor of claim 10, wherein the color change of the thermal energy sensitive material is permanent.

* * * * *